(12) United States Patent
Nolan-Brown (10) Patent No.: US 8,038,188 B1
(45) Date of Patent: Oct. 18, 2011

(54) PET WASTE CLEANUP KIT

(76) Inventor: Patricia Nolan-Brown, Wakefield, MA (US)

( * ) Notice: Subject to any disclaimer, the term of this patent is extended or adjusted under 35 U.S.C. 154(b) by 392 days.

(21) Appl. No.: 12/315,333

(22) Filed: Dec. 2, 2008

(51) Int. Cl.
*A01K 29/00* (2006.01)

(52) U.S. Cl. .......................... 294/1.3; 119/796

(58) Field of Classification Search .................. 294/1.1, 294/1.3; 383/33, 34, 34.1; 119/795, 796, 119/792, 161, 769, 791, 793, 794, 797, 798, 119/867, 868, 806; D15/150, 161
See application file for complete search history.

(56) References Cited

U.S. PATENT DOCUMENTS

| | | | | |
|---|---|---|---|---|
| 3,806,984 A * | 4/1974 | Hilsabeck | .................. | 294/1.3 |
| 4,138,153 A * | 2/1979 | Brown | .................. | 294/1.4 |
| 4,230,354 A * | 10/1980 | Claras | .................. | 294/1.3 |
| 4,917,238 A * | 4/1990 | Schumacher | .................. | 206/223 |
| 5,560,321 A * | 10/1996 | Hess | .................. | 119/858 |
| 6,126,215 A | 10/2000 | Jahns | | |
| 6,257,473 B1 * | 7/2001 | Ringelstetter | .................. | 224/675 |
| D453,067 S * | 1/2002 | Cody | .................. | D3/215 |
| 7,073,462 B1 * | 7/2006 | Layman | .................. | 119/161 |
| 2006/0231043 A1 * | 10/2006 | Galdo | .................. | 119/796 |
| 2009/0095225 A1 * | 4/2009 | O'Connell | .................. | 119/161 |
| 2010/0027917 A1 * | 2/2010 | McCann | .................. | 383/10 |

\* cited by examiner

*Primary Examiner* — Saul Rodriguez
*Assistant Examiner* — Stephen Vu
(74) *Attorney, Agent, or Firm* — John P. McGonagle (57) ABSTRACT

A kit containing a plurality of pet waste containers each of which may scoop or pick up pet excrement is provided. Each container provides a plastic bag with a simple frame about the bag mouth. Each pet waste container is held in a pouch removably attached to a leash until desired for use. The used pet waste container is then grasped by a squeeze clip which is attached to a ring attached to the pouch until convenient for disposal.

15 Claims, 13 Drawing Sheets

PET WASTE CLEANUP KIT

BACKGROUND OF THE INVENTION

This invention relates generally to the field of waste management and, in particular, to a kit containing apparatus used to facilitate cleanup and transport of pet waste.

Many pet owners walk their pet to provide the pet with exercise and an opportunity to relieve themselves away from the pet owner's domicile. Nearly all pet owners will have a leash either directly attached to the pet during the walk or in hand while controlling the pet with voice commands. In most locations, local ordinances require the pet owner to clean up pet waste excreted by their pets. During nearly every pet walk, the pet will have been trained to relieve itself at least once. During longer walks and hikes, this will occur more than once.

Therefore, it would be most convenient for the pet owner to have several disposable pet waste containers removably attached to the pet leash. It is then desirable that the pet waste container be sealable and reattachable to the pet leash, thereby providing the pet owner with hand-free and convenient transport of the pet waste container until disposed of.

SUMMARY OF THE INVENTION

The present invention provides a kit containing pet waste containers each of which has the means for scooping or picking up pet excrement. Each present invention container provides a plastic bag with a simple frame about the bag mouth. Each pet waste container is held in a pouch removably attached to a leash until desired for use. When desired, a pet waste container is removed from the pouch. Before use, the frame is held in a folded position with the bag contained within the folded frame. The frame has a release which when activated pops open the frame allowing the bag body to drop free while the bag mouth is attached to the frame. The frame allows the excrement to be scooped into the bag. Alternatively, the excrement may be picked up by passing a hand against the bag and through the frame onto the excrement thereby covering the excrement with the bag body. The enclosed excrement is then pulled back through the frame and the frame reclosed, thereby reclosing the bag mouth with the excrement held within the bag body. The used pet waste container is then grasped by a squeeze clip which is attached to a ring attached to the pouch until convenient for disposal.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
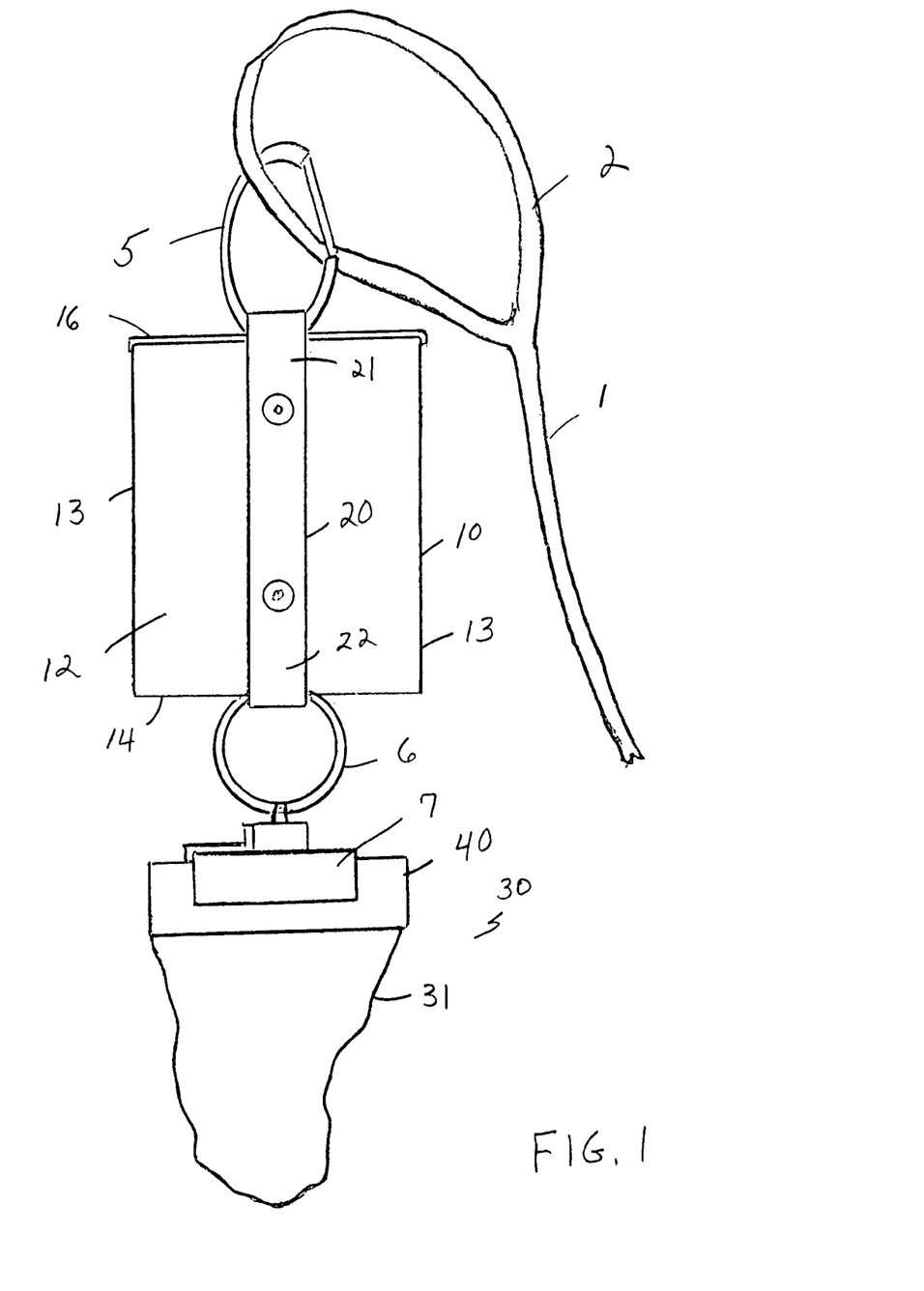
FIG. 1 is a perspective view of the invention.
Figure 2:
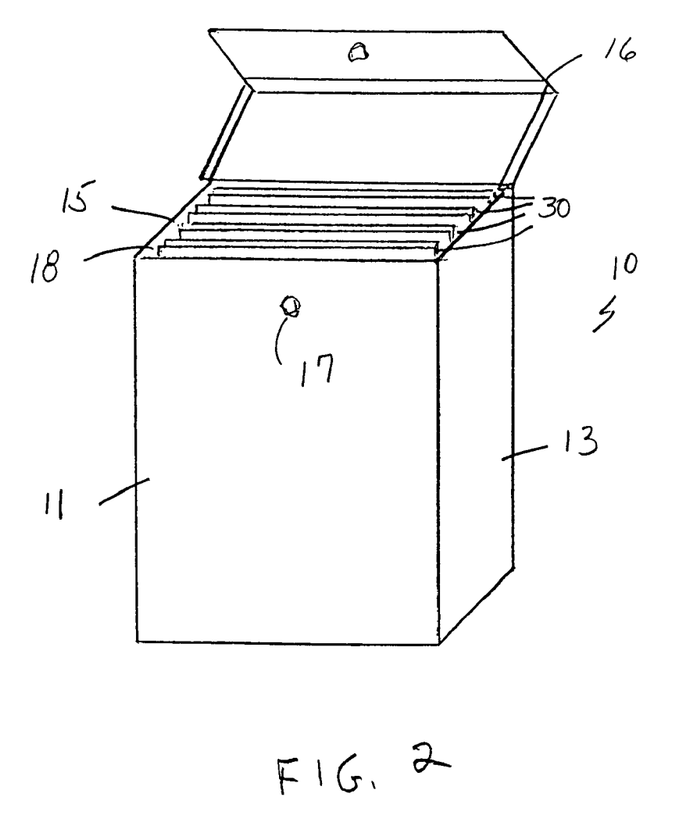
FIG. 2 is a front perspective view of the invention pouch.

Referring to the drawings in detail wherein like elements are indicated by like numerals, there is shown a pouch 10 removably attached to a leash 1 by means of a carabiner 5. The carabiner 5 is preferably attached to the leash handle 2 or loop acting as a handle. The pouch 10 has a generally rectangular cross section and has a front 11, rear 12, two opposite connecting sides 13, a bottom 14 and an open top 15. The pouch 10 has a generally rectangular lid 16 with one side attached at a junction formed by the pouch rear 12 and top 15, said lid 16 adapted to extend over the pouch open top 15 and attach to the pouch front 11 near to the pouch top 15. The lid 16 is preferably attached to the front 11 by means of a hook and loop fastener 17, such as sold under the trademark VELCRO. The pouch front, rear, sides, bottom and top define a pouch interior 18. The pouch 10 is preferably made from a flexible, weather-resistant material such as nylon. The pouch rear 12 has a double loop 20 attached centrally thereto, said double loop 20 having an upper loop 21 extending near to the pouch top 15 and a lower loop 22 extending near to the pouch bottom 14. The pouch upper loop 21 has a carabiner 5 removably attached thereto. The carabiner 5 is adapted to attached to a leash, preferably a leash handle 2. The pouch lower loop 22 has a circular ring 6 removably attached thereto. One or more squeeze clips 7 are attached to the ring 6. The clips 7 are adapted to hold used pet waste containers 30.

Figure 3:
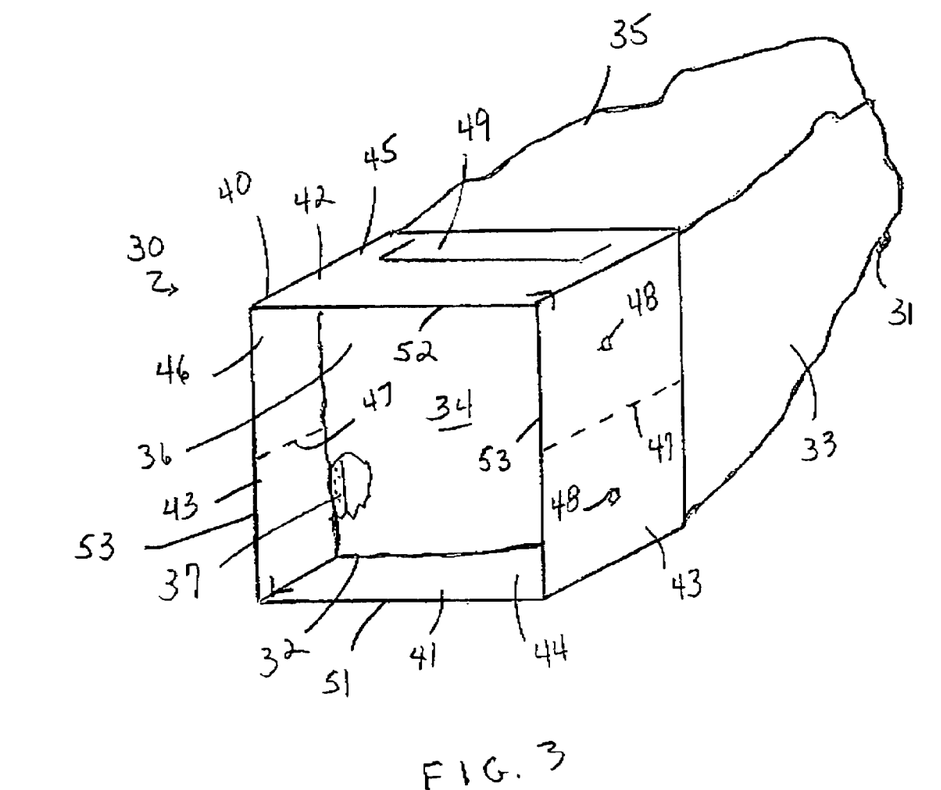
FIG. 3 is a front perspective view of the invention pet waste container.

The pouch interior 18 holds a plurality of pet waste containers 30. Each container 30 is comprised of a bag 31 attached to a frame 40. The bag 31 has an mouth 32 opening into a body 33. The body 33 defines a bag interior 34. The bag body 33 has an exterior surface 35 and an interior surface 36. The bag mouth 32 is attached to the frame 40. The bag 31 is made from a liquid impervious material such as a biodegradable plastic.

The container frame 40 is rectangular in shape, having a flat bottom element 41, a flat top element 42, and a pair of opposite lateral elements 43 interconnecting said bottom and top elements. The frame bottom, top and lateral elements define a frame interior 44. The frame 40 has an exterior surface 45 and an interior surface 46. The bottom element 41 has a front edge 51. The top element 42 has a front edge 52. The frame top and bottom elements 42, 41 have clip indents 49 adjacent the frame rear 50. Each lateral element 43 also has a front edge 53. Each lateral element 43 has a straight score line 47 midway between and parallel to the bottom and top elements 41, 42. The frame exterior surface 45 has four adhesive patches 48, two on each lateral element 43, each lateral element having one adhesive patch 48 near the bottom element 41 and one adhesive patch 48 near the top element 42. Alternatively, one adhesive patch 48 or glue dot may be used on each lateral element 43. The bag exterior surface 35 has an adhesive strip 37 about the bag mouth 32. The bag exterior surface adhesive strip 37 is attached to the frame interior surface 46 thereby attaching the bag mouth 32 to the frame bottom, top and lateral elements. Alternatively, instead of attaching the adhesive strip 37 to the bag, an adhesive strip 37 could be attached to the frame interior surface 46. The effect for attachment of the bag mouth 32 to the frame interior surface 46 would be the same.

Figure 8:
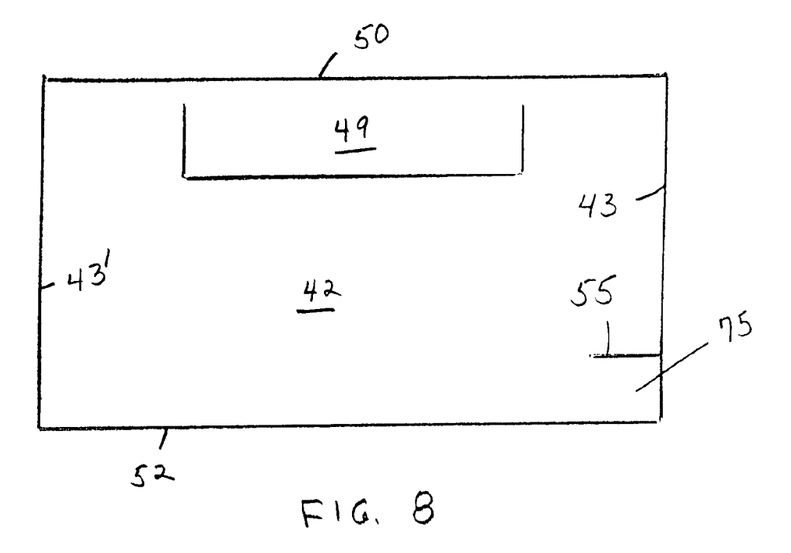
FIG. 8 is a top view of the frame.
Figure 14A:
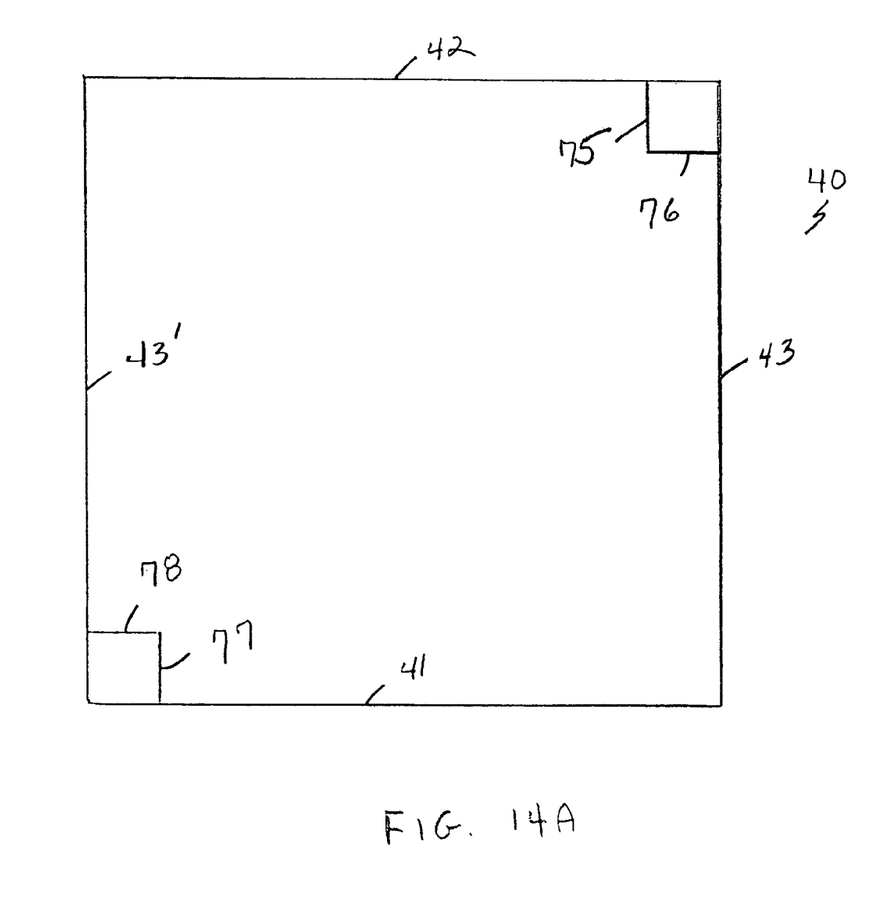
FIG. 14A is a front view of the frame with the corner locks activated.

The frame top 42 has a notched channel 55 formed parallel to and near the top front edge 52 and one of said lateral elements 43. The notched channel 55 extends to and then continues downward into the said lateral element 43 a desired distance, said lateral element portion 56 of the notched channel being parallel to the lateral element front edge 53. The frame top portion between the notched channel 55 and top front edge 52 is designated 75. The lateral element portion between the notched channel lateral element portion 56 and the lateral element front edge 53 is designated 76.

Figure 9:
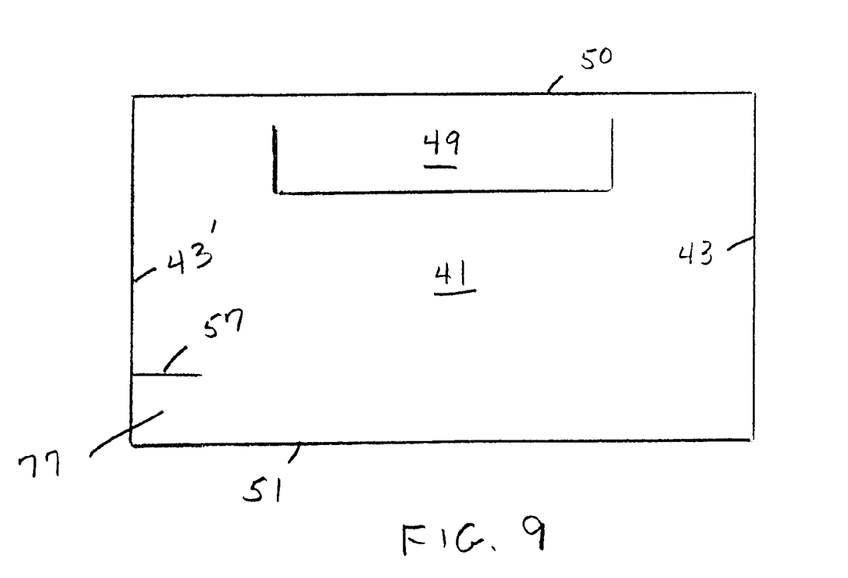
FIG. 9 is a bottom view of the frame.
Figure 10:
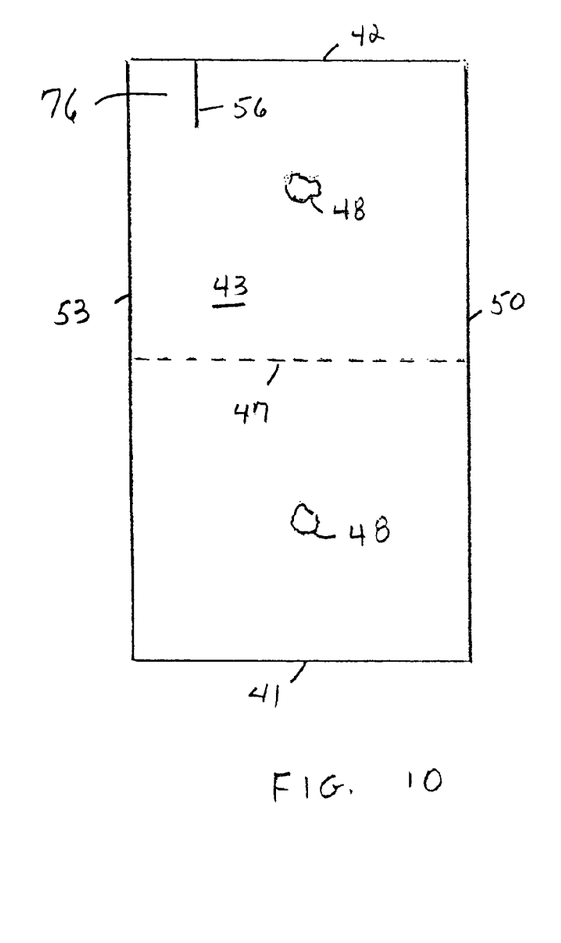
FIG. 10 is a right side view of the frame.
Figure 11:
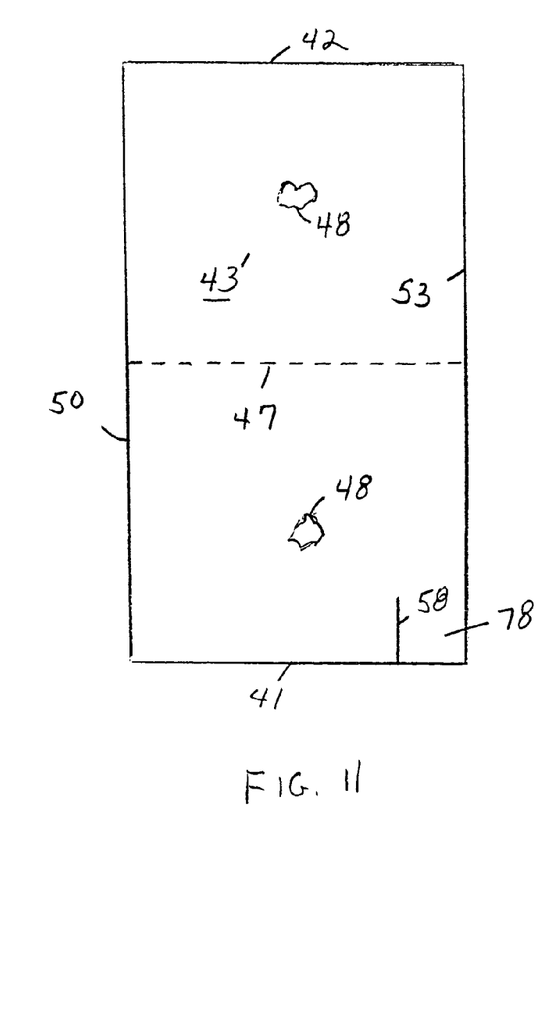
FIG. 11 is a left side view of the frame.
Figure 14B:
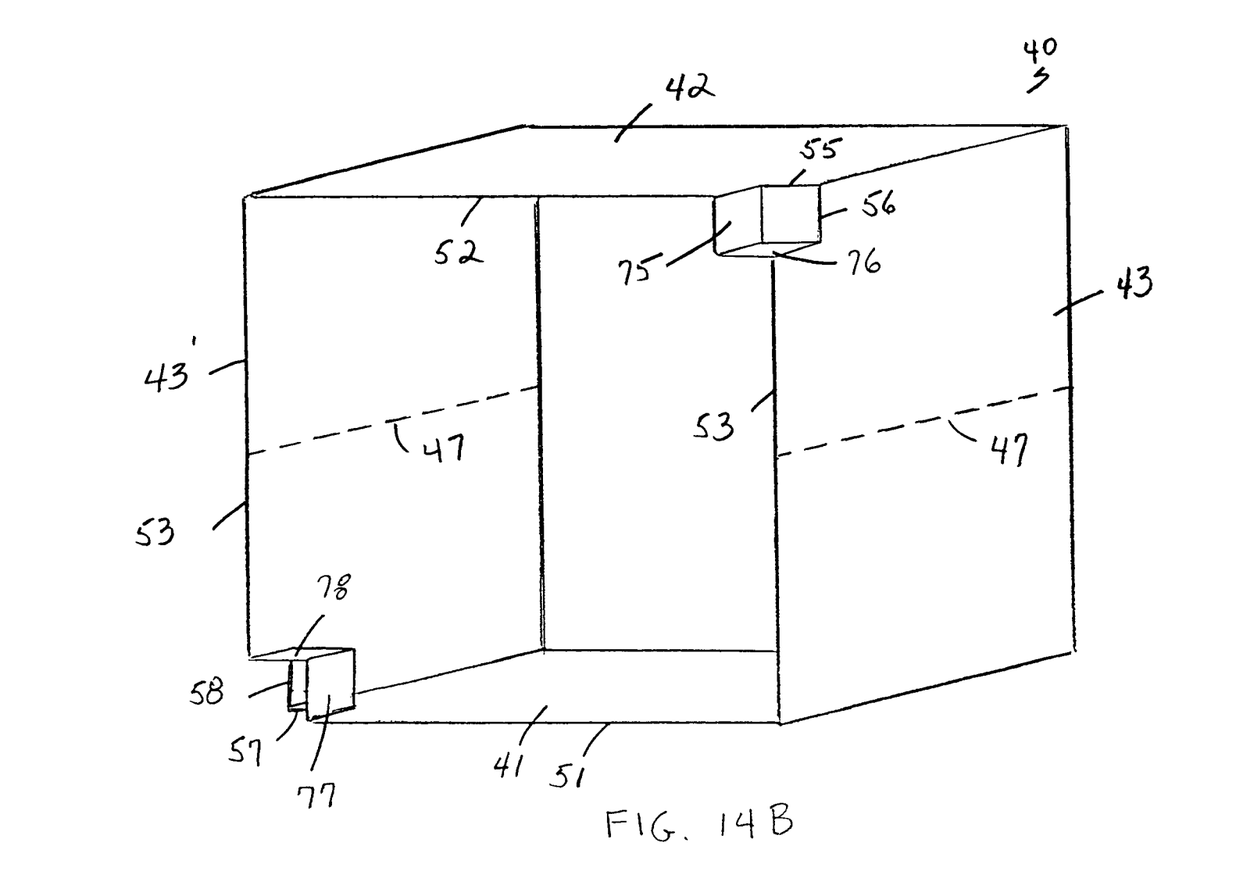
FIG. 14B is a front perspective view of the frame with the corner locks activated.

The frame bottom 41 has a notched channel 57 formed parallel to and near the bottom front edge 51 and the other lateral element 43' opposite the lateral element containing the notched channel 56. The frame bottom portion between the notched channel 57 and bottom front edge 51 is designated 77. The notched channel 57 extends to and then continues upward into the said lateral element 43' a desired distance, said lateral element portion 58 of the notched channel being parallel to the lateral element front edge 53. The lateral element portion between the notched channel lateral element portion 58 and the lateral element front edge 53 is designated 78. By pressing inward the portions 75, 76, 77, 78 of the frame between the notched channels and the front edges a "lock" is formed at opposite corners of the frame 40 holding the frame open in a generally rectangular configuration.

Figure 15:
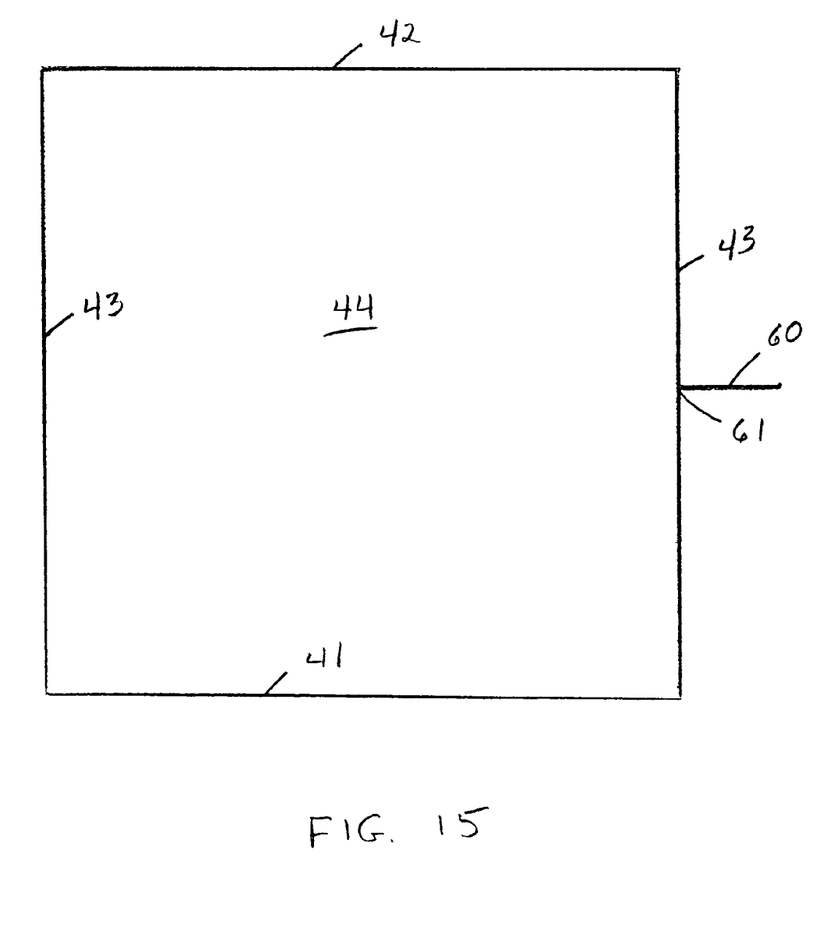
FIG. 15 is a front view of an alternate embodiment of the frame.
Figure 16:
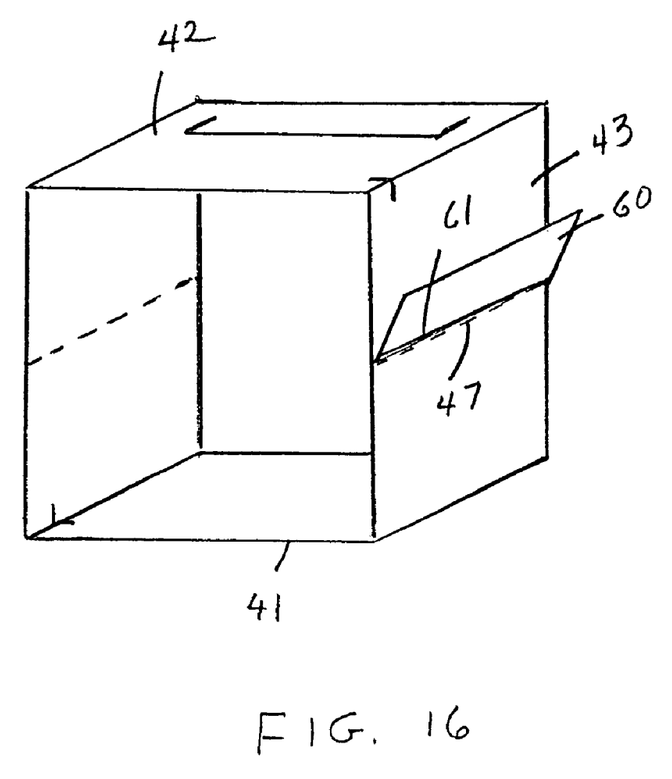
FIG. 16 is a front perspective view of the alternate embodiment shown in FIG. 15.

In an alternative embodiment, a flat rectangular holding element 60 is pivotally attached along one of the holding element's long sides 61 to one of the lateral elements 43 along that lateral element's score line 47. In the frame 40 folded position, the holding element 60 pivots along the lateral element's score line 47 against the lateral element external surface 45. When the frame 40 is unfolded, the holding element 60 will protrude outward from the adjacent lateral element 43. The holding element 60 acts as a handle when the pet waste container 30 is used in a "scoop" mode.

Figure 12:
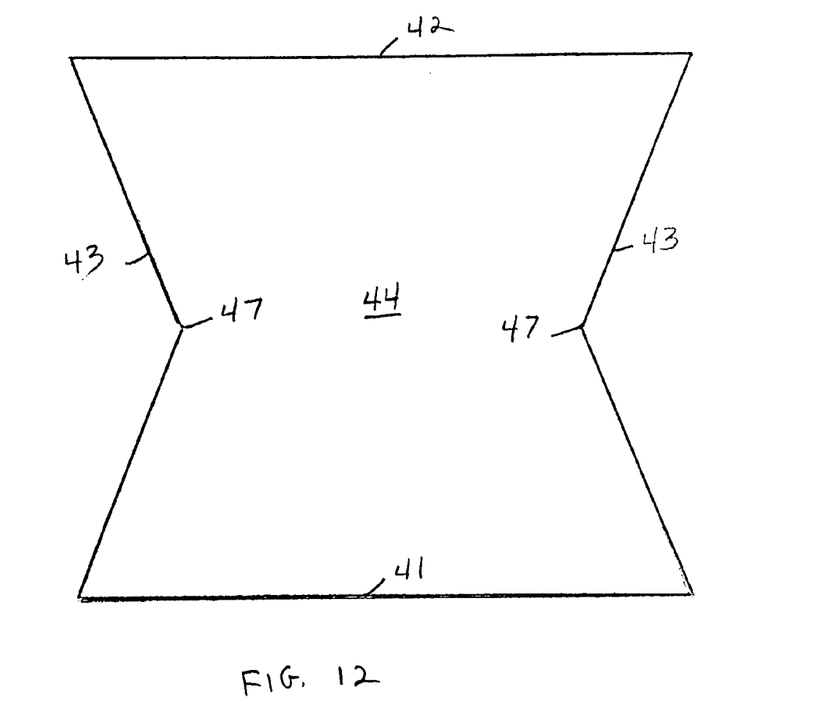
FIG. 12 is a front view of the frame partly folded.
Figure 13:
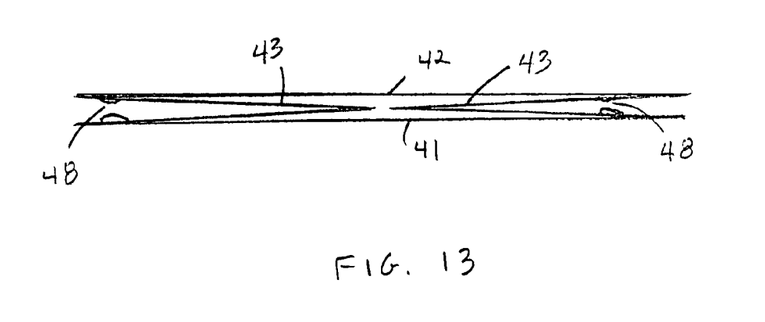
FIG. 13 is a front view of the frame folded.

In an unused mode, the bag body 33 is bunched up about the bag mouth 32. The frame 40 is folded along the lateral element score lines 47 wherein the lateral elements 43 are folded inward into the frame interior 44, and the frame top 42 and bottom 41 elements are closed toward each other. Each lateral element's adhesive patches 48 engage each other thereby holding the frame 40 in a folded closed position with the bag 31 enclosed within the frame 40. The unused pet waste container 30 is then stored in the pouch interior 18.

Figure 4:
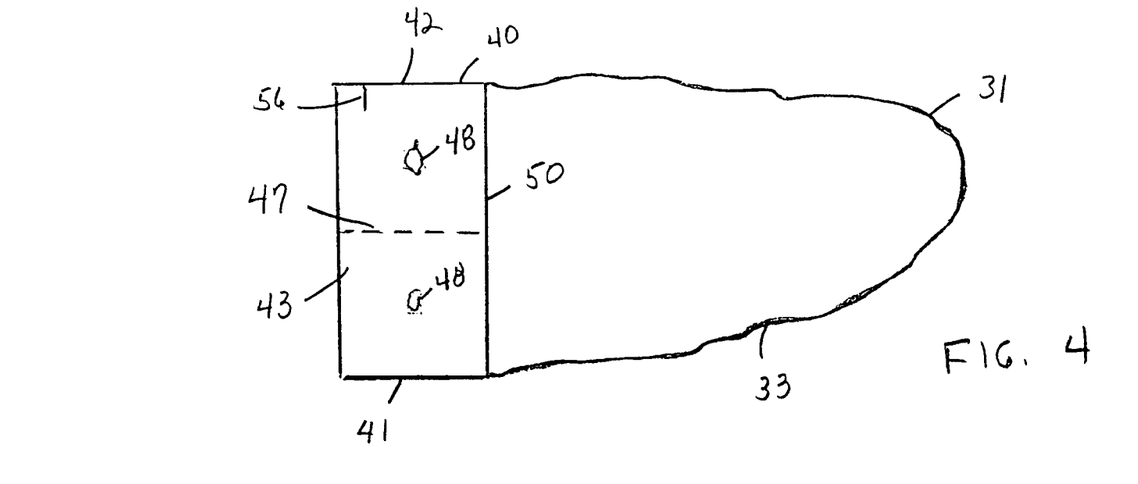
FIG. 4 is a side view of the invention pet waste container in an open position.
Figure 5:
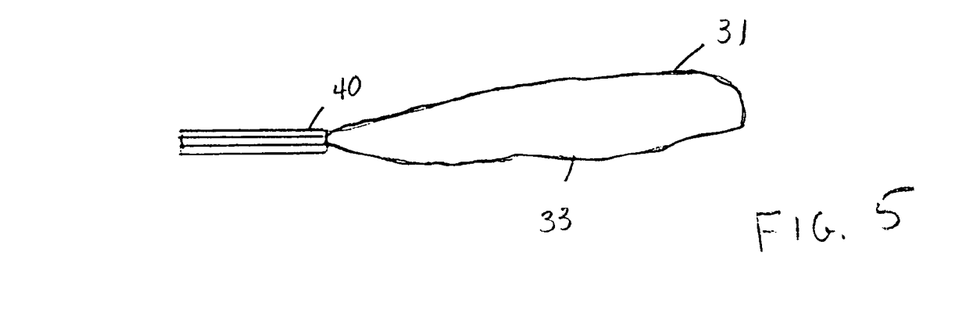
FIG. 5 is a side view of the invention pet waste container in a closed position.
Figure 6:
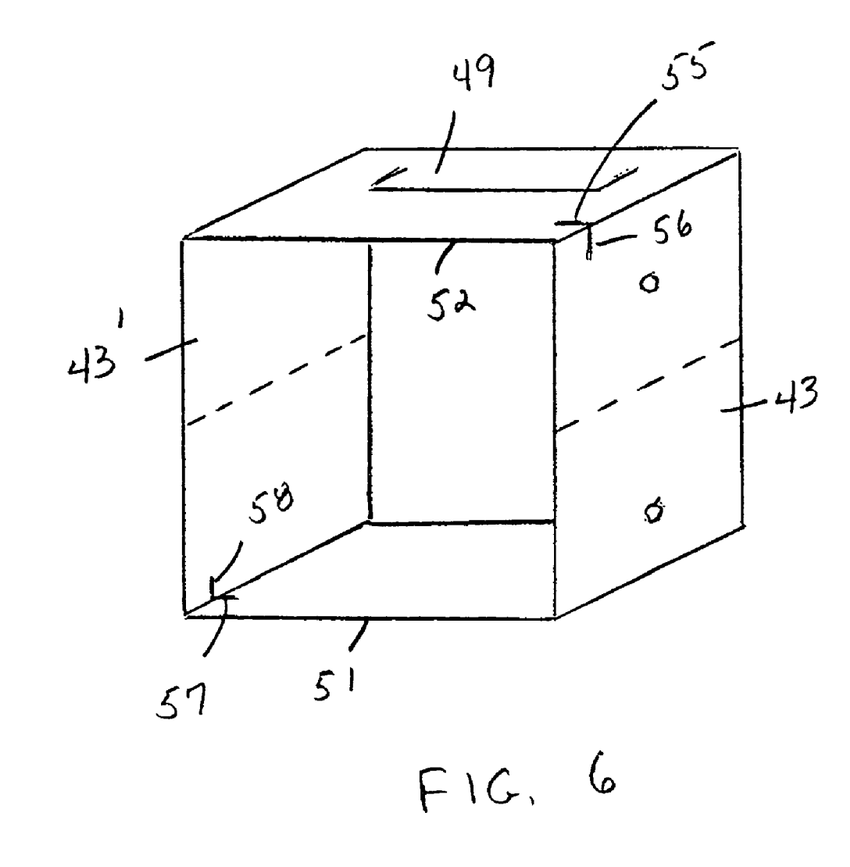
FIG. 6 is a front perspective view of the pet waste container frame in an open position.
Figure 7:
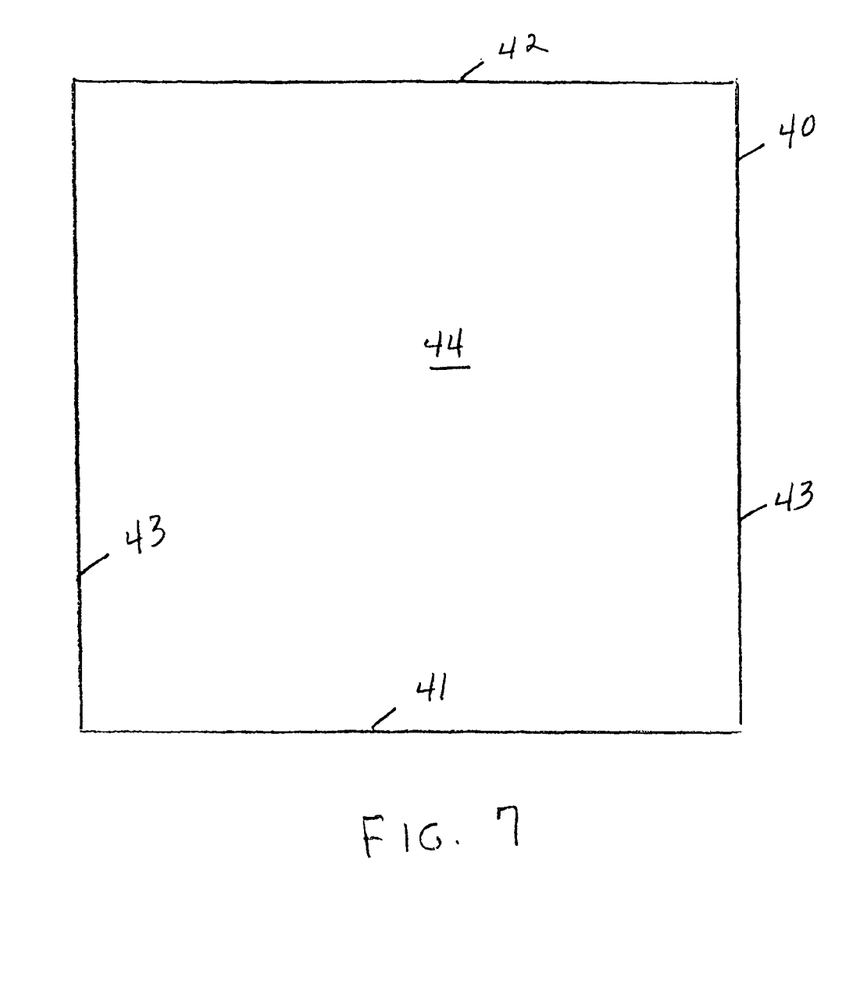
FIG. 7 is a front view of an open frame.

To use a pet waste container 30, the pouch lid 16 is opened and a folded container 30 is drawn from the pouch interior 18. The container frame top 42 and bottom 41 are gently separated with the lateral elements 43 then straightening and the bag body 33 falling free from the frame interior 44. To pick up waste, the pet walker places his/her hand into the bag body 33, picks up the waste, and pulls the waste enclosed in the bag through the frame 40. The frame 40 is then closed along the lateral element score lines 47 and then sealed by means of the four adhesive patches 48. Generally, the pet waste container 30 is then discarded or grasped along the clip indent 49 by a squeeze clip 7, and attached to the ring 6 on the pouch lower loop 22 for discard at a later time.

The present invention pet waste container 30 may be used as a scoop. The frame 40 is opened as described above. A "lock" is then formed at opposite corners of the frame 40 as described above thereby holding the frame open in a generally rectangular configuration. The pet waste container 30 may be grasped by an alternative embodiment handle 60 protruding from one of the lateral elements 43. The frame bottom front edge 51 is then pushed below and against the waste thereby bringing the waste into the bag mouth 32 attached to the frame interior surface 36. The frame 40 is then closed along the lateral element score lines 47 and then sealed by means of the four adhesive patches 48. The pet waste container 30 is then discarded or grasped by a squeeze clip 7 which is attached to the pouch lower loop 22 for discard at a later time.

It is understood that the above-described embodiment is merely illustrative of the application. Other embodiments may be readily devised by those skilled in the art which will embody the principles of the invention and fall within the spirit and scope thereof.

I claim:

1. A pet waste cleanup kit comprising:
   a pouch removably attached to a leash, said pouch having a generally rectangular cross section and having a front, rear, two opposite connecting sides, a bottom and an open top, wherein said front, rear, sides, bottom and top of said pouch defining a pouch interior;
   a plurality of pet waste containers, each of said containers comprising a bag attached to a frame wherein the bag has a mouth opening into a body, said bag body defining a bag interior, said bag body having an exterior surface and an interior surface, said bag mouth being attached to the frame;
   wherein said pouch interior is adapted to hold said plurality of pet waste containers;
   wherein the frame is rectangular in shape, having a flat bottom element, a flat top element, and two opposite lateral elements interconnecting said flat bottom and flat top elements, wherein said flat bottom, flat top and two lateral of said frame elements defining a frame interior, said frame having an exterior surface and an interior surface, further wherein said flat bottom, flat top and two lateral elements each having a front edge, and each of the lateral elements having a straight score line midway between and parallel to the bottom and top elements; and
   a plurality of frame exterior surface adhesive patches on said lateral elements.

2. The pet waste cleanup kit as recited in claim 1, further comprising:
   a frame top notched channel parallel to and near a top front edge of one of said lateral elements, said frame top notched channel extending to and continuing downward into one of said lateral elements a predetermined distance;
   a frame bottom notched channel parallel to and near a bottom front edge of the other lateral element opposite a lateral element containing a portion of the frame top notched channel, said frame bottom notched channel extending to and continuing upward into said other lateral element a predetermined distance.

3. The pet waste cleanup kit as recited in claim 2, further comprising:
   a ring detachably attached to the pouch adjacent the pouch bottom;

a plurality of squeeze clips removably attached to said ring, each of said squeeze clips adapted to hold a used pet waste container.

4. The pet waste cleanup kit as recited in claim 3, further comprising:
a clip removably attached to the pouch adjacent the pouch top.

5. The pet waste cleanup kit as recited in claim 4, wherein:
the pouch has a generally rectangular lid with one side attached at a junction formed by the rear and top of the pouch, said lid adapted to extend over the open top and attach to the front near to the pouch top.

6. The pet waste cleanup kit as recited in claim 5, further comprising:
a flat rectangular holding element having opposite long sides, said holding element pivotally attached along one of the long sides to one of the lateral elements along the score line.

7. The pet waste cleanup kit as recited in claim 6, wherein:
the flat top and flat bottom elements have clip indents adjacent the rear of the frame.

8. The pet waste cleanup kit as recited in claim 7, further comprising:
a bag exterior surface adhesive strip about the bag mouth, said bag exterior surface adhesive strip attaching the bag mouth to the interior surface of the bag body.

9. The pet waste cleanup kit as recited in claim 7, further comprising:
an adhesive strip attached to the interior surface of the bag body.

10. A pet waste container, comprising:
a bag attached to a container frame wherein the bag has a mouth opening into a body, said bag body defining a bag interior, said bag body having an exterior surface and an interior surface, said bag mouth being attached to the frame;
wherein the container frame is rectangular in shape, has a flat bottom element, a flat top element, and two opposite lateral elements interconnecting said flat bottom and flat elements, wherein said flat bottom, flat top and two lateral elements defining a frame interior, said container frame having an exterior surface and an interior surface, said flat bottom, flat top and two lateral elements each having a front edge, each of the lateral elements having a straight score line midway between and parallel to the flat bottom and flat top elements;
a plurality of frame exterior surface adhesive patches on said lateral elements;
a frame top notched channel parallel to and near a top front edge of one of said lateral elements, said frame top notched channel extending to and continuing downward into one of said lateral elements a predetermined distance;
a frame bottom notched channel parallel to and near a bottom front edge and the other lateral element opposite the lateral element containing the portion of the frame top notched channel, said frame bottom notched channel extending to and continuing upward into said other lateral element a predetermined distance.

11. A pet waste container as recited in claim 10, further comprising:
a squeeze clips adapted to hold a used pet waste container.

12. A pet waste container as recited in claim 11, further comprising:
a flat rectangular holding element having opposite long sides, said holding element pivotally attached along one of the long sides to one of the lateral elements along the score line of the lateral elements.

13. The pet waste container as recited in claim 12, wherein:
the flat top and bottom elements have clip indents adjacent the rear of the frame.

14. The pet waste cleanup kit as recited in claim 13, further comprising:
a bag exterior surface adhesive strip about the bag mouth, said bag exterior surface adhesive strip attaching the bag mouth to the interior surface of the bag body.

15. The pet waste cleanup kit as recited in claim 13, further comprising:
an adhesive strip attached to the interior surface of the bag body.

* * * * *